(12) United States Patent
Savage et al.

(10) Patent No.: US 11,779,154 B2
(45) Date of Patent: Oct. 10, 2023

(54) DEEP FRYER COMBUSTION BURNER SYSTEM

(71) Applicant: PITCO FRIALATOR, INC., Bow, NH (US)

(72) Inventors: Steven Savage, Concord, NH (US); Steven J. Cyr, Londonderry, NH (US); Michael McGinnis, Windham, NH (US); Charles E. Pierce, Boscawen, NH (US); Karl M. Searl, Newmarket, NH (US)

(73) Assignee: PITCO FRIALATOR, INC., Bow, NH (US)

( * ) Notice: Subject to any disclaimer, the term of this patent is extended or adjusted under 35 U.S.C. 154(b) by 0 days.

(21) Appl. No.: 17/053,403

(22) PCT Filed: May 1, 2019

(86) PCT No.: PCT/US2019/030123
§ 371 (c)(1),
(2) Date: Nov. 6, 2020

(87) PCT Pub. No.: WO2019/217169
PCT Pub. Date: Nov. 14, 2019

(65) Prior Publication Data
US 2021/0222873 A1     Jul. 22, 2021

Related U.S. Application Data

(60) Provisional application No. 62/667,835, filed on May 7, 2018.

(51) Int. Cl.
*A47J 37/12*     (2006.01)
*F23C 5/08*     (2006.01)
(Continued)

(52) U.S. Cl.
CPC .......... *A47J 37/1247* (2013.01); *F23C 5/08* (2013.01); *A47J 37/1242* (2013.01); *F23D 14/50* (2013.01);
(Continued)

(58) Field of Classification Search
CPC ........ F28D 2021/0024; F28D 21/0003; F23D 14/00; F23D 14/50; F23C 5/00;
(Continued)

(56) References Cited

U.S. PATENT DOCUMENTS 3,638,558 A * 2/1972 Bennett ............... A47J 37/1233
99/408
4,704,290 A * 11/1987 Fritzsche ............ A47J 37/1233
99/403

(Continued)

*Primary Examiner* — Steven B Mcallister
*Assistant Examiner* — Benjamin W Johnson
(74) *Attorney, Agent, or Firm* — SEYFARTH SHAW LLP; Brian Michaelis

(57) ABSTRACT

A burner assembly system is disposed in a rear side, i.e. back side, of a deep fryer. The burner assembly system includes an aperture disposed in a side of a bottom portion at the rear of a fryer cabinet of the controlled deep fryer. A burner at the rear of the fryer cabinet is coupled to the aperture and is adapted to receive fuel that enters through the aperture. An ignition assembly is disposed within the burner and ignites the received fuel. A flue is disposed at the rear of and within the fryer cabinet and receives combustion gases and heat from the burner created by the ignition of fuel. A heat exchanger is disposed within the flue at the rear of the fryer cabinet and is heated by heat conveyed through the flue from the ignition of fuel in the burner.

17 Claims, 4 Drawing Sheets

(51) Int. Cl.
*F23D 14/50* (2006.01)
*F28D 21/00* (2006.01)

(52) U.S. Cl.
CPC .. *F28D 21/0003* (2013.01); *F28D 2021/0024* (2013.01)

(58) Field of Classification Search
CPC .......... F23C 5/08; A47J 37/12; A47J 37/1247; A47J 37/1242
USPC ....................................................... 126/39 E
See application file for complete search history.

(56) References Cited

U.S. PATENT DOCUMENTS

| | | | | |
|---|---|---|---|---|
| 6,044,839 | A * | 4/2000 | Furuhashi | A47J 37/1247 126/378.1 |
| 7,731,490 | B2 * | 6/2010 | Reale | F23D 14/583 431/3 |
| 2003/0127088 | A1 * | 7/2003 | Takeda | A47J 37/1247 126/391.1 |

* cited by examiner

DEEP FRYER COMBUSTION BURNER SYSTEM

RELATED APPLICATIONS

This application claims priority to U.S. Provisional Patent Application No. 62/667,835, filed May 7, 2018, which is expressly incorporated by reference herein in its entirety.

FIELD OF TECHNOLOGY

The present application relates to food fryers, and in particular to deep fryers.

BACKGROUND

Various types of deep fryers for frying food are known. For example, traditional fryers have a frying vat wherein food (for example, French fries or chicken) may be placed in baskets and the baskets with food submerged within cooking medium, e.g., frying liquid (cooking oil or lard) within the vat. The cooking medium is heated to a high temperature, typically, by fuel burners that may be located at the bottom of the vat, within the cooking medium. Fuel burned by the fuel burners generates heat that is imparted to the cooking medium or frying liquid, which in turn cooks the food in the baskets. Alternatively, other heating elements (for example, electrical heating elements) may traverse the bottom of the frying vat within the frying liquid. The electrical heating elements disposed with the frying liquid impart heat to the frying liquid to fly food in the baskets submerged within the frying liquid. Such known fryers tend to require relatively significant amounts of oil in the fryer vat surrounding the burners and up to a level that also encompasses the baskets with food disposed within the fryer vat. Large amounts of oil are relatively expensive as those larger volumes of oil need to be replaced periodically (and frequently if the burners are run very hot and a lot of food is fried in the process).

Fryers are also known that reduce the amount of oil required for use with the fryer, referred to herein as Reduced Oil Volume or ROV fryers. Some fryers eliminate the heating elements within the flyer vat and thus eliminate the need to be able to clean around heating elements, and reduce the volume of oil used in frying. In some such flyers the burner tubes and/or burners are placed near the front of the flyer cabinet beneath the flyer vat. Such placement makes components of the heating system accessible for service, however, that may involve placement of the burners closer to system electronics, user interface(s) and frontally exposed cabinetry. Since the burners project heat to an extent, such placement may result in the front of the fryer being hotter than necessary. Such placement may also have deleterious effects of closely located electronic components. Also, the heat from the burner system ends up being more dispersed throughout the fryer cabinet than may be advantageous.

SUMMARY

The present disclosure provides a burner assembly system configuration/structure and location for a deep fryer that heats a cooking medium within a flying vat more effectively while avoiding deleterious effects on any electronic components contained within the deep fryer. The disclosed burner assembly system is disposed in a rearward position, i.e. back side, of the deep fryer (away from the front where an operator and operator interfaces are positioned). The disclosed burner assembly system is able to more effectively heat a cooking medium that is used by the deep flyer by reducing the distance heated oil needs to travel. The disclosed configuration substantially reduces negative effects heating elements may have on electronic components contained within the deep flyer.

The burner assembly system according to the disclosure includes an aperture disposed in a side of a bottom portion at the rear of a flyer cabinet of the controlled deep flyer, configured to receive fuel from a fuel line connected to the deep flyer. The burner assembly system also includes a burner connected to the aperture. The burner receives fuel (e.g. gas) that enters through the aperture, and includes an ignition assembly of the burner that is configured to ignite the fuel received from the fuel line. The burner is disposed above the aperture at a bottom and rearward portion (i.e. proximate to the back side) of the flyer cabinet.

The burner assembly system also includes a flue (i.e., heat conveying channel) disposed above the burner within and at the rear of the fryer cabinet. The flue extends to a flue exit at a top portion of the cabinet at the rear of the fryer cabinet. The flue receives heat from the burner created by the ignition of the fuel. A heat exchanger is disposed within the flue above the burner and beneath the flue exit. The heat exchanger within the flue is heated by heat traveling through the flue from the ignition of the fuel in the burner. The heat exchanger is configured to heat the cooking medium from the deep fryer when the cooking medium is passed through the heat exchanger. The additional heat received from the burner as a result of the heat exchanger being disposed within the flue enhances the efficiency of heating the oil via the heat exchanger in the deep fryer. The heat exchanger within the flue is behind the vat/frypot of the deep fryer. The flue emits any gases from the burner at the flue exit at the top of the flue that extends to the top portion of the fryer cabinet. The burner assembly according to the disclosure may be housed in an enclosure within the fryer cabinet, which may further assist in containing heat.

Accordingly, the heat exchanger and other heating elements, at the rear of the fryer cabinet, are spaced from any sensitive electronics within the deep fryer. Further, the location and configuration of the heat exchanger reduces the distance the cooking medium needs to travel once the cooking medium passes through the heat exchanger. Heat is more efficiently utilized.

Advantages of the present disclosure will become more apparent to those skilled in the art from the following description of detailed embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which.

DETAILED DESCRIPTION

The present disclosure provides a burner assembly system that is efficient and provides a mechanism for heating a cooking medium. In one exemplary use, the burner assembly system may be used to efficiently heat the cooking medium, such as cooking oil, or the like, used in a controlled cooking system, such as a deep flyer, a Reduced Oil Volume (ROV), or the like. The burner assembly system may provide an efficient way of heating to, and maintaining, a desired temperature for the cooking medium in the deep fryer while containing heat to a more desirable location within the deep flyer.

Figure 1:
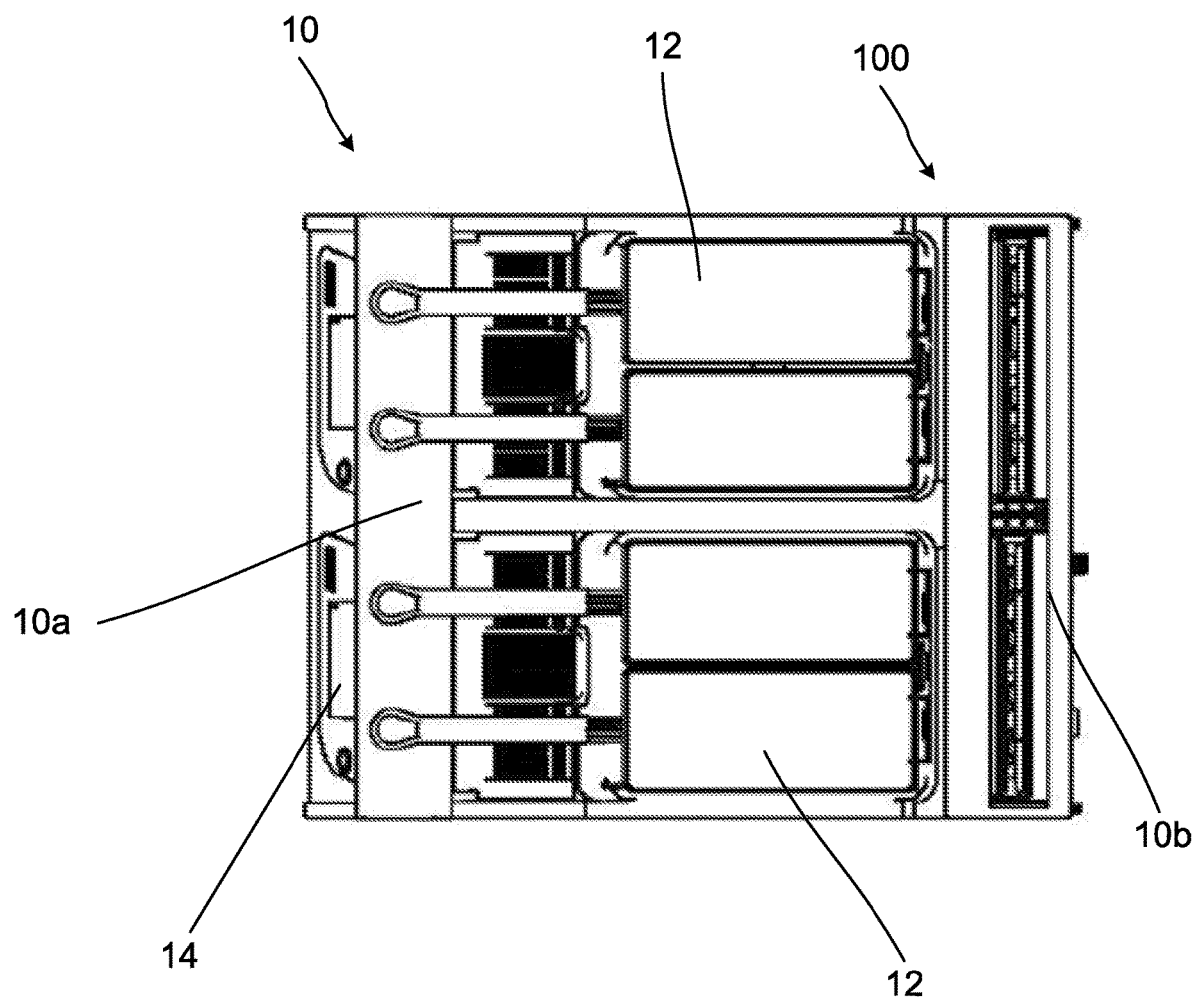
FIG. 1 is a top perspective view illustrating a deep fryer with a burner assembly system according to the disclosure.
Figure 2A:
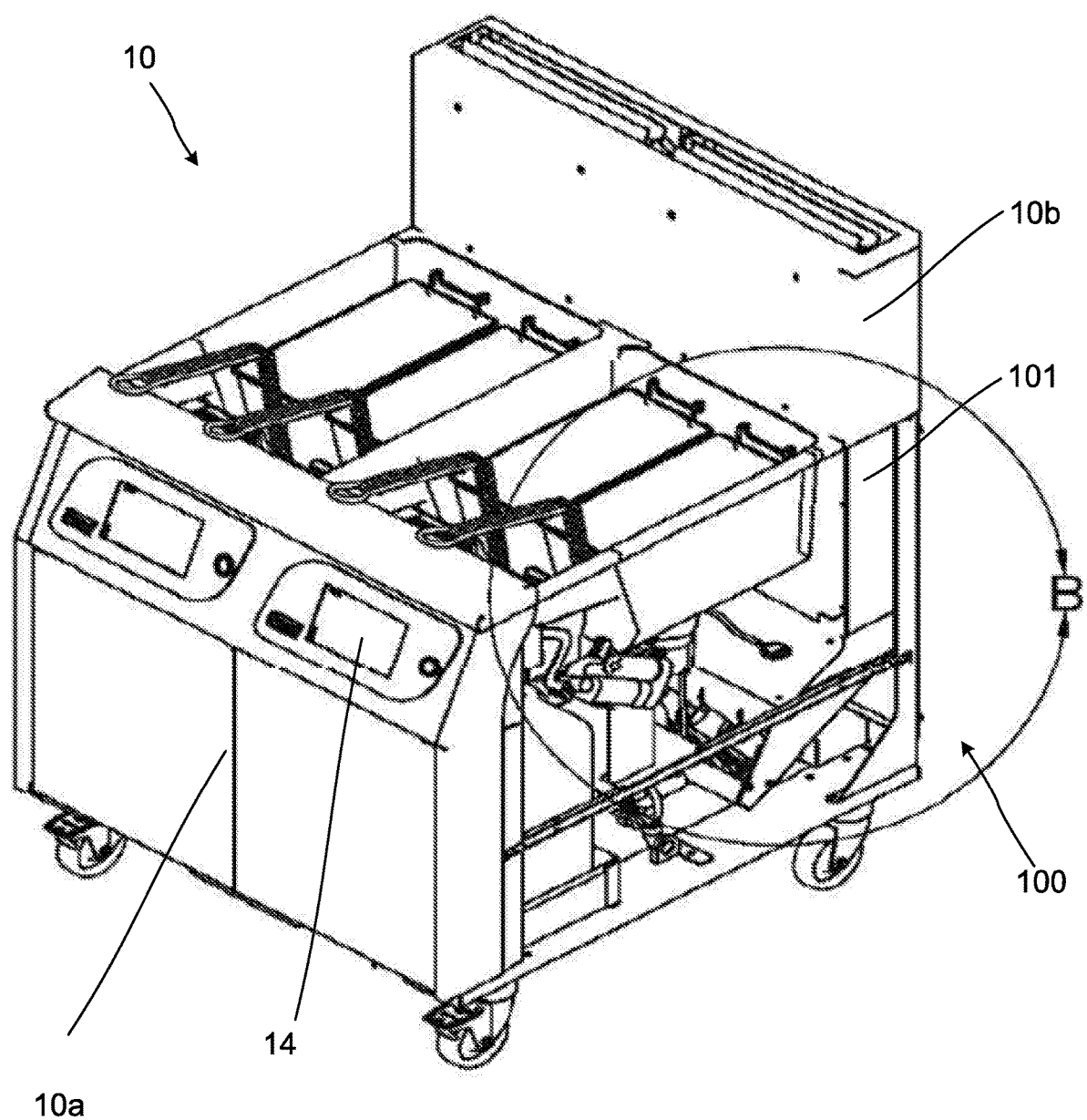
FIGS. 2A and 2B are a side view and partially sectioned view, respectively, of section B of the deep fryer of FIG. 1 illustrating a deep flyer burner assembly system according to the disclosure.
Figure 2B:
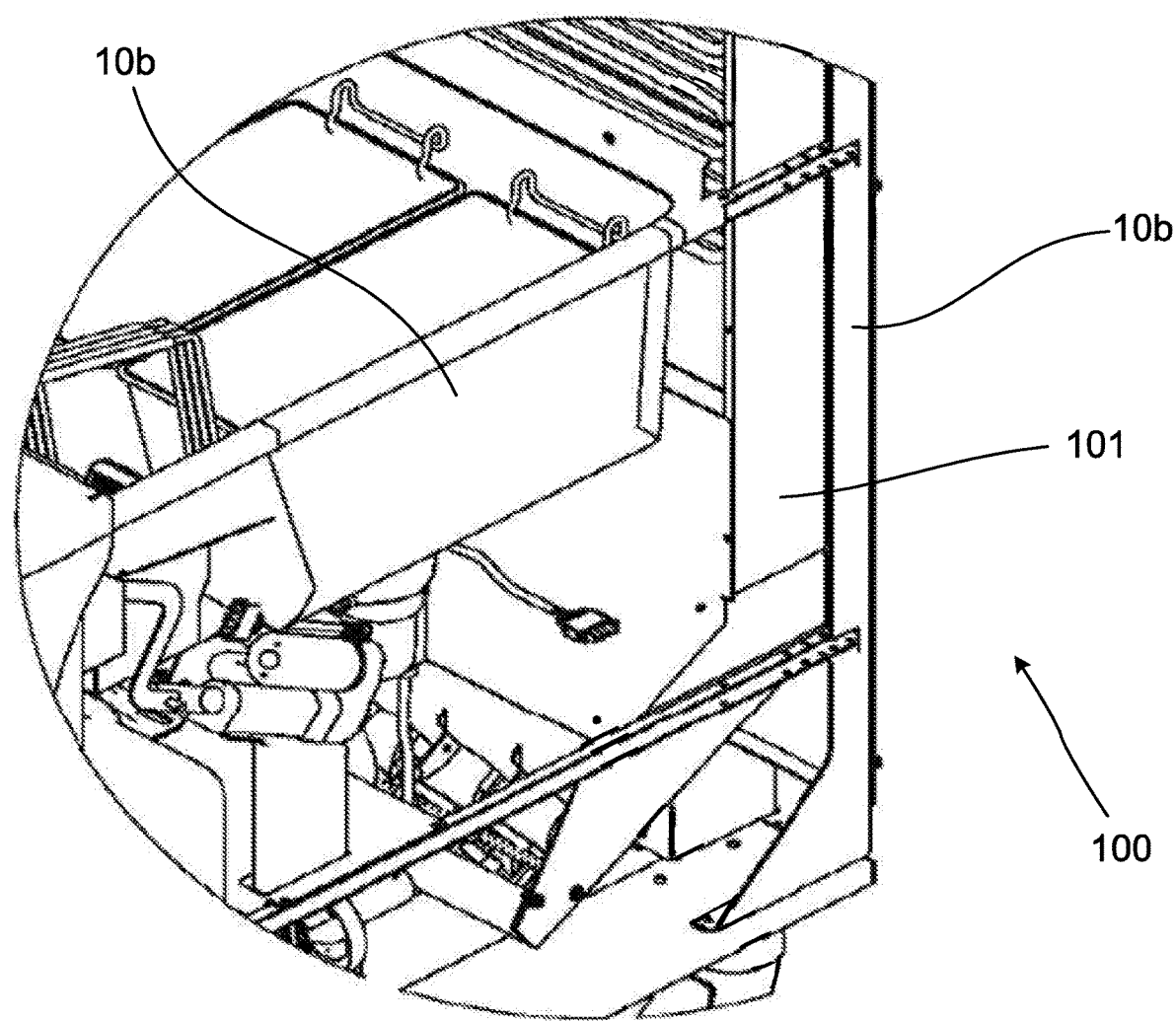
Figure 3:
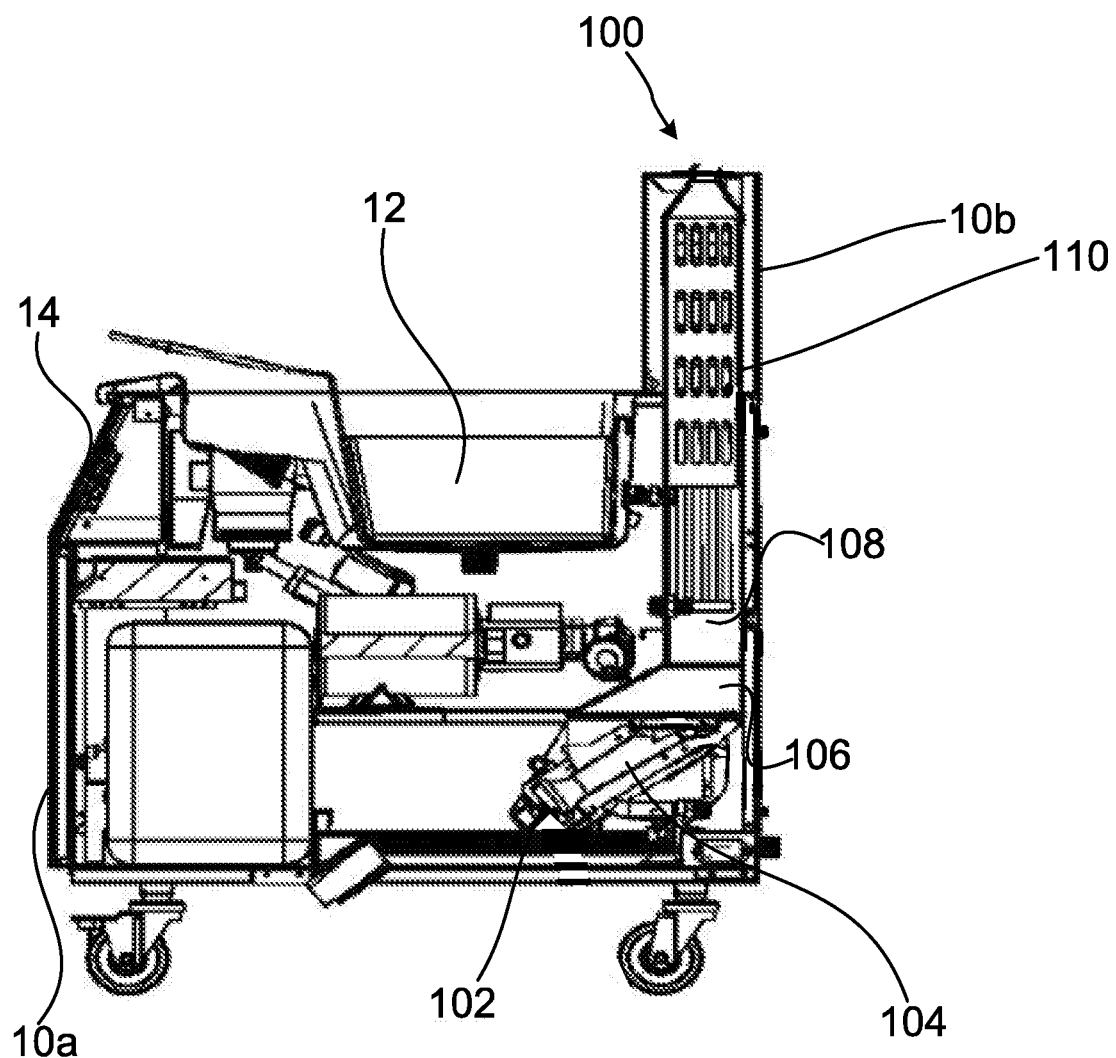
FIG. 3 is a side sectioned view of the deep fryer of FIG. 1 illustrating a deep fryer burner assembly system according to the disclosure.

FIGS. 1-3 illustrate a deep flyer 10 that includes a burner assembly system 100, contained in a housing 101 (best seen in FIGS. 2A and 2B), that can be used to efficiently heat and maintain a temperature of a cooking oil that is contained within a vat or frypot 12 of the deep fryer 10. The deep fryer 10 may also have a plurality of vats 12, as illustrated in FIGS. 1 and 2A. In addition, the deep fryer 10 may have electrical/electronic control components 14 disposed in a front side 10a of the deep flyer 10. According to an embodiment of the present disclosure, the deep fryer 10 may be a Reduced Oil Volume (ROV) deep flyer, or the like.

The deep flyer 10 has a burner assembly system 100 disposed substantially adjacent to a rear portion, i.e. back side, 10b that is opposite of the front side 10a, as illustrated in FIG. 2A. In the configuration according to the disclosure, the burner assembly system 100 is disposed within the deep fryer with the burner assembly system 100 disposed away from proximity to an operator and electronic control components 14. Detrimental effects on the operation and maintenance of the electronic components 14 in the deep flyer 10 may be avoided by disposing the burner assembly system 100 within the deep fryer 10 on a rear side and away from the electronic components 14.

FIGS. 2A, 2B and 3 are side sectioned views of the deep flyer of FIG. 1 that illustrate the burner assembly system 100 in more detail. The burner assembly system includes an aperture 102 (best seen in FIG. 3) disposed in a side 10b of a bottom portion of a fryer cabinet of the deep fryer 10. The aperture is configured to receive fuel, e.g. gas, to be used by the burner assembly system 100 from a fuel source such as a gas line, gas tank, or the like. The aperture may be any of various sizes or shapes that allow the burner assembly system 100 to safely receive fuel.

The burner assembly system 100 also includes at least one burner assembly 104 (in an illustrative implementation four burner assemblies are implemented, referred to herein as the "burner assembly"), connected to the aperture. The burner assembly 104 may be directly coupled to the aperture 102 or it may be indirectly coupled to the aperture 102 via tubing or lines that transport fuel/gas. The burner assemblies 104 are disposed above the aperture 102 within the fryer cabinet of the deep fryer 10. Further, the burner assemblies 104 are configured to generate heat that can be used by the deep fryer 10, and more specifically the burner assembly system 100. Each burner assembly 104 may have a single burner or multiple burners disposed within the burner assembly 104.

Each of the burners in the burner assembly 104 may be one or more of atmospheric burners, jet burners, power burners or the like.

In an illustrative implementation self-cleaning burners, such as disclosed in U.S. Pat. No. 7,731,490, which is incorporated by reference herein in its entirety, may be implemented. Each of the self-cleaning burners may include a cleaning tube from a source of gas, an ignition source, and be controlled by a controller configured to control the flow of gas. The cleaning tube has a plurality of perforations that run adjacent to the ignition. When desired, the controller opens a valve to allow gas to flow into the cleaning tube. The gas flowing through the cleaning tube may then be ignited by the ignition source and the flame may run along the cleaning tube, which will then ignite other gases within the self-cleaning burner. The ignition of the other gases inside the burner cleans the burner. The self-cleaning burner helps keep the burner clean and operating in a more efficient manner.

The burner assembly 104 also includes an ignition assembly 106, which may be used as the ignition source for the self-cleaning burner, that is configured to ignite the gas the burner assembly 104 receives from the fuel source. The ignition assembly may be any of various assemblies capable of igniting the fuel received by the burner 104, such as a pilot assembly or the like.

The burner assembly system also includes a flue 108 disposed above the burner 104 within the fryer cabinet. The flue extends to a top portion of the deep fryer 10 at the rear of the fryer cabinet. The flue 108 is configured to receive the heat from the burner assembly 104 created when the ignition assembly 106 ignites fuel in the burners 104. The flue 108 may also be a series of channels that are able to convey heat through the fryer cabinet. The flue 108 emits gases from the burners 104 at a top portion of the fryer cabinet.

A heat exchanger 110 may be disposed at the rear of the fryer cabinet, within the flue 108, above the burner assembly 104. The heat exchanger 110 may be heated by heat received by the flue 108 from the ignition of fuel in the burner assembly 104. The heat exchanger 110 is configured to provide additional heat to the cooking oil when the cooking oil is passed through the heat exchanger 110. The additional heat received from the burner assembly as a result of the heat exchanger being disposed within the flue increases efficiency of heating of the oil. The heat exchanger 110 within the flue 108 above the burner assembly 104 may be insulated within the flue in order to reduce convection issues. For example, a sheet metal jacket, with spaces filled by high temperature insulation, may be implemented within the flue (or outside the flue within the housing).

According to an embodiment of the present disclosure, the burner assembly 104 may also be disposed on along a front side, a back side, or along the sides of the distal portion 10b of the deep fryer 10. Further, the burner assembly 104 may also be disposed along an upper portion of the heat exchanger 110/flue 108. That is, the burner assembly 104 may be disposed part way up the heat exchanger 110/flue 108 to reduce a distance the heat from the burner assembly 104 has to travel to be received by the flue 108.

While the burner assembly system described above is depicted as used by a deep flyer, one of ordinary skill in the art should appreciate that other equipment may benefit from the system disclosed herein. Further, one of ordinary skill in the art would readily understand any appropriate modifications to the system disclosed herein for application with other equipment that could benefit from this system.

Although the burner assembly 104 is described as a self-cleaning burner, such as disclosed in U.S. Pat. No. 7,731,490, it should be appreciated that the burner may be any of various types of burners, and the burner assembly system 100 could include an air cleaning system or scrubber.

Those skilled in the art should appreciate that the burner assembly system described and illustrated may be housed in a unitary housing with panels accessible for servicing each of the components in the assembly system stack, or each component (burners, heat exchanger, flue) could be segmented and fastened together from separately housed components to form the assembly stack.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

While various embodiments are disclosed herein, it should be understood that the invention is not so limited and modifications may be made without departing from the disclosure. The scope of the disclosure is defined by the appended claims, and all devices that come within the meaning of the claims, either literally or by equivalence, are intended to be embraced therein.

What is claimed is:

1. A burner assembly system, comprising:
   an aperture disposed in a side of a bottom portion at a rear of a cabinet, the aperture connected to a fuel source;
   at least one burner assembly disposed proximate to the bottom portion at the rear of the cabinet, the at least one burner assembly coupled to and disposed proximate to the aperture, the at least one burner assembly receiving fuel through the aperture from the fuel source;
   a flue disposed immediately above the at least one burner assembly within and at the rear of the fryer cabinet, behind a frypot, that extends to a flue exit at a top of the cabinet at the rear of the cabinet, the flue including at least one channel conveying heat through the cabinet; and
   a heat exchanger disposed within the flue at the rear of the cabinet, the heat exchanger positioned to receive heat from a flue gas traveling from the at least one burner assembly through the flue to the top of the cabinet;
   the heat exchanger having a cooking medium passing through the heat exchanger, the cooking medium receiving heat from the heat exchanger and from the flue gas travelling from the at least one burner assembly through the flue to the top of the cabinet;
   wherein an outlet of the at least one burner assembly, the heat exchanger and the flue are disposed completely behind the frypot.

2. The burner assembly system of claim 1, wherein the at least one burner assembly includes a self-cleaning burner.

3. The burner assembly system of claim 1, further comprising an ignition assembly igniting the fuel received by the at least one burner assembly from the fuel source.

4. The burner assembly system of claim 1, wherein the at least one burner assembly is coupled to the aperture by tubing adapted to transport the fuel.

5. The burner assembly system of claim 1, wherein the flue emits the flue gas from the at least one burner assembly from a top portion of the cabinet.

6. The burner assembly system of claim 1, wherein the heat exchanger is insulated within the flue.

7. A burner assembly system for a deep fryer, comprising:
   an aperture disposed in a side of a bottom portion at a rear of a fryer cabinet of the deep fryer;
   a self-cleaning burner coupled to and disposed proximate to the aperture at the rear of the fryer cabinet of the deep fryer and receiving fuel from the aperture, the self-cleaning burner disposed at the rear of the fryer cabinet of the deep fryer and comprising a cleaning tube including a plurality of perforations;
   a controller periodically controlling the flow of fuel to the cleaning tube;
   an ignition source disposed adjacent to the cleaning tube and igniting the fuel flowing to the cleaning tube;
   a flue disposed within and at the rear of the fryer cabinet, behind a frypot, that extends to a flue exit of the deep fryer immediately above the self-cleaning burner, the flue including at least one channel conveying heat through the cabinet;
   a heat exchanger disposed at the rear of the fryer cabinet of the deep fryer and disposed within the flue, the heat exchanger conveying heat from a flue gas traveling from the self-cleaning burner through the flue, to a cooking fluid passing through the heat exchanger; and
   a housing disposed at the rear of the fryer cabinet of the deep fryer, housing the self-cleaning burner, the flue and the heat exchanger;
   wherein an outlet of the self-cleaning burner, the heat exchanger and the flue are disposed completely behind the frypot.

8. The burner assembly system of claim 7, further comprising an ignition assembly igniting the fuel received by the self-cleaning burner from the fuel source.

9. The burner assembly system of claim 7, wherein the self-cleaning burner is coupled to the aperture by tubing adapted to transport the fuel.

10. The burner assembly system of claim 7, wherein the flue emits the flue gas from the self-cleaning burner from a top portion of the cabinet.

11. The burner assembly system of claim 7, wherein the heat exchanger is insulated within the flue.

12. A burner assembly system, comprising:
   an aperture disposed in a side of a bottom portion at a rear of a cabinet, the aperture connected to a fuel source;
   at least one burner assembly coupled to the aperture, and receiving fuel through the aperture from the fuel source;
   a flue disposed within and at the rear of the cabinet, behind a frypot, that extends to a flue exit at a top of the cabinet at the rear of the cabinet, the flue including at least one channel conveying heat through the cabinet;
   a heat exchanger disposed within the flue at the rear of the cabinet, the heat exchanger positioned to receive heat from a flue gas traveling from the at least one burner assembly through the flue and heat exchanger to the top of the cabinet, the heat exchanger passing a cooking medium through the heat exchanger, the cooking medium receiving heat from the heat exchanger; and a housing disposed at the rear of the cabinet, housing the at least one burner assembly, the flue and the heat exchanger;
wherein an outlet of the at least one burner assembly, the heat exchanger and the flue are disposed completely behind the frypot.

13. The burner assembly system of claim 12, wherein the at least one burner assembly is disposed along an upper portion of the heat exchanger.

14. The burner assembly system of claim 13, wherein the at least one burner assembly is disposed along a front portion and a back portion of the housing.

15. The burner assembly system of claim 13, wherein the at least one burner assembly is disposed along each side portion of the housing.

16. The burner assembly system of claim 12, wherein the at least one burner assembly is coupled to the aperture by tubing adapted to transport gas.

17. The burner assembly system of claim 12, wherein the heat exchanger is insulated within the flue.

* * * * *